United States Patent

[11] 3,633,603

| [72] | Inventors | Owen Desmond Arthur Charles Furlong;<br>Michael Arthur Bennett Young, both of<br>Yeovil, England |
|---|---|---|
| [21] | Appl. No. | 879,650 |
| [22] | Filed | Nov. 25, 1969 |
| [45] | Patented | Jan. 11, 1972 |
| [73] | Assignee | Normalair-Garrett Limited<br>Yeovil, Somerset, England |
| [32] | Priority | Nov. 25, 1968 |
| [33] | | Great Britain |
| [31] | | 55,778/68 |

[54] CONTROL SYSTEMS
8 Claims, 8 Drawing Figs.

| [52] | U.S. Cl. | 137/81.5 |
|---|---|---|
| [51] | Int. Cl. | F15c 1/04 |
| [50] | Field of Search | 137/81.5;<br>235/200, 201 |

[56] References Cited
UNITED STATES PATENTS

| 3,072,147 | 1/1963 | Allen et al. | 137/81.5 X |
| 3,357,441 | 12/1967 | Adams | 137/81.5 |
| 3,404,701 | 10/1968 | Shiiki | 137/81.5 |
| 3,410,291 | 11/1968 | Boothe et al. | 137/81.5 |
| 3,429,248 | 2/1969 | Furlong | 137/81.5 X |
| 3,443,575 | 5/1969 | Hughes | 137/81.5 |
| 3,444,877 | 5/1969 | Atchley | 137/81.5 |
| 3,452,665 | 7/1969 | Furlong | 137/81.5 X |
| 3,485,253 | 12/1969 | Boothe | 137/81.5 |
| 3,499,599 | 3/1970 | Meinmyer et al. | 137/81.5 X |

*Primary Examiner*—Samuel Scott
*Attorney*—Larson, Taylor and Hinds

ABSTRACT: A fluidic controlled pressure reducing valve where fluid amplifiers are utilized to sense pressure variations within a chamber, and present an amplified output signal to control the operation of the valve, the circuit also including an override device which enables the valve to be maintained in the fully open or closed position, irrespective of the fluid amplifier control signals.

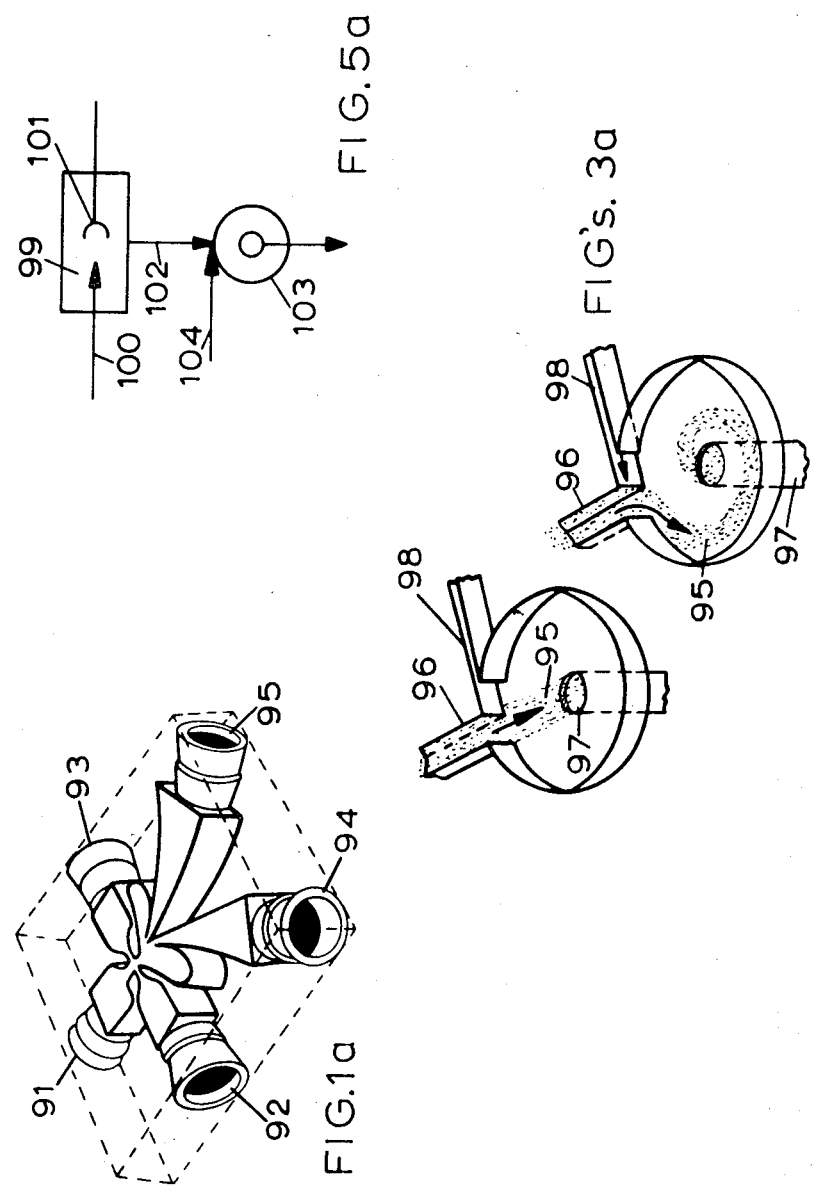

CONTROL SYSTEMS

This invention relates to fluidic control circuitry particularly, although not exclusively, to a control system applied to a pressure-reducing valve.

According to the invention there is provided a control system for a device which regulates parametral variations, said system comprising one or more fluid amplifiers of the type where a principal fluid stream is caused to flow through one or more outlets by the interaction of a control stream, said control stream becoming operable upon said principal fluid stream in response to a signal indicative of a change in parametral conditions, the resultant output thereafter being utilized to actuate the device to the selected condition.

Figure 1:
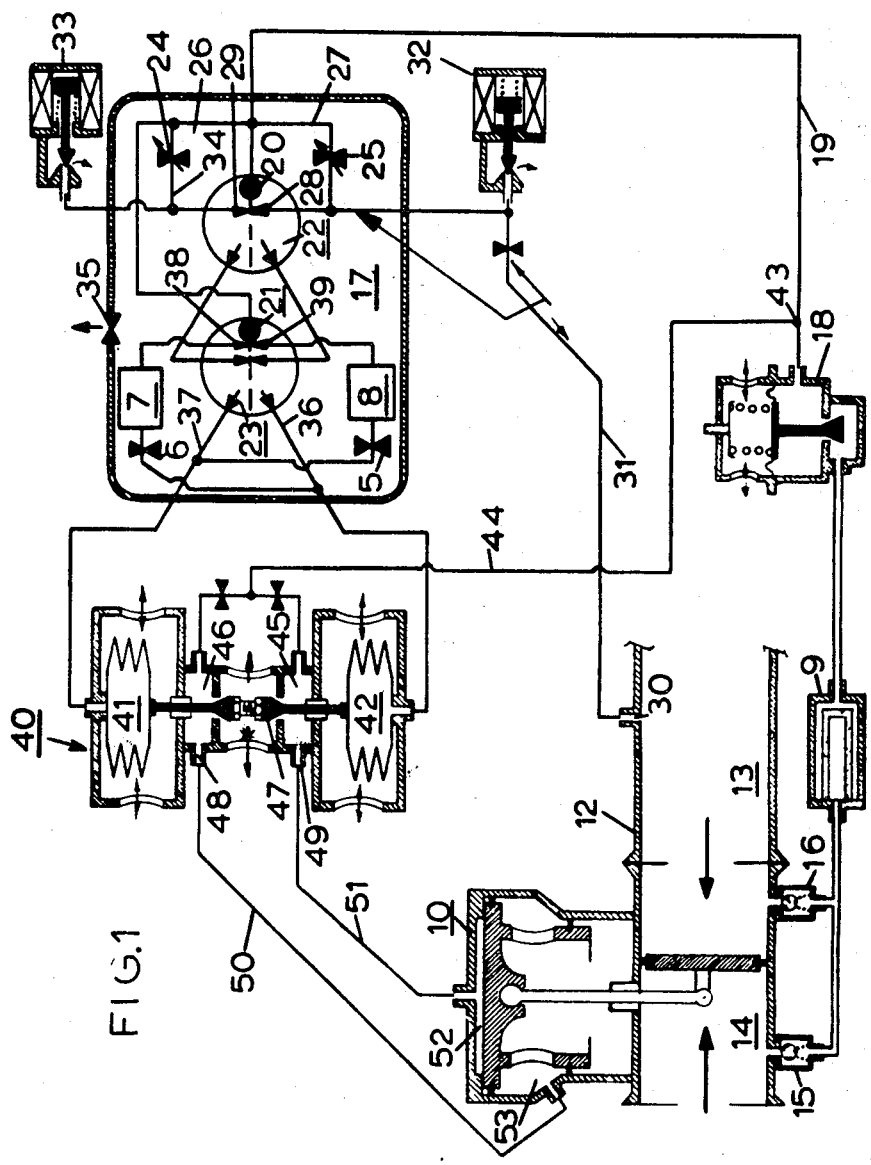
Figure 2:
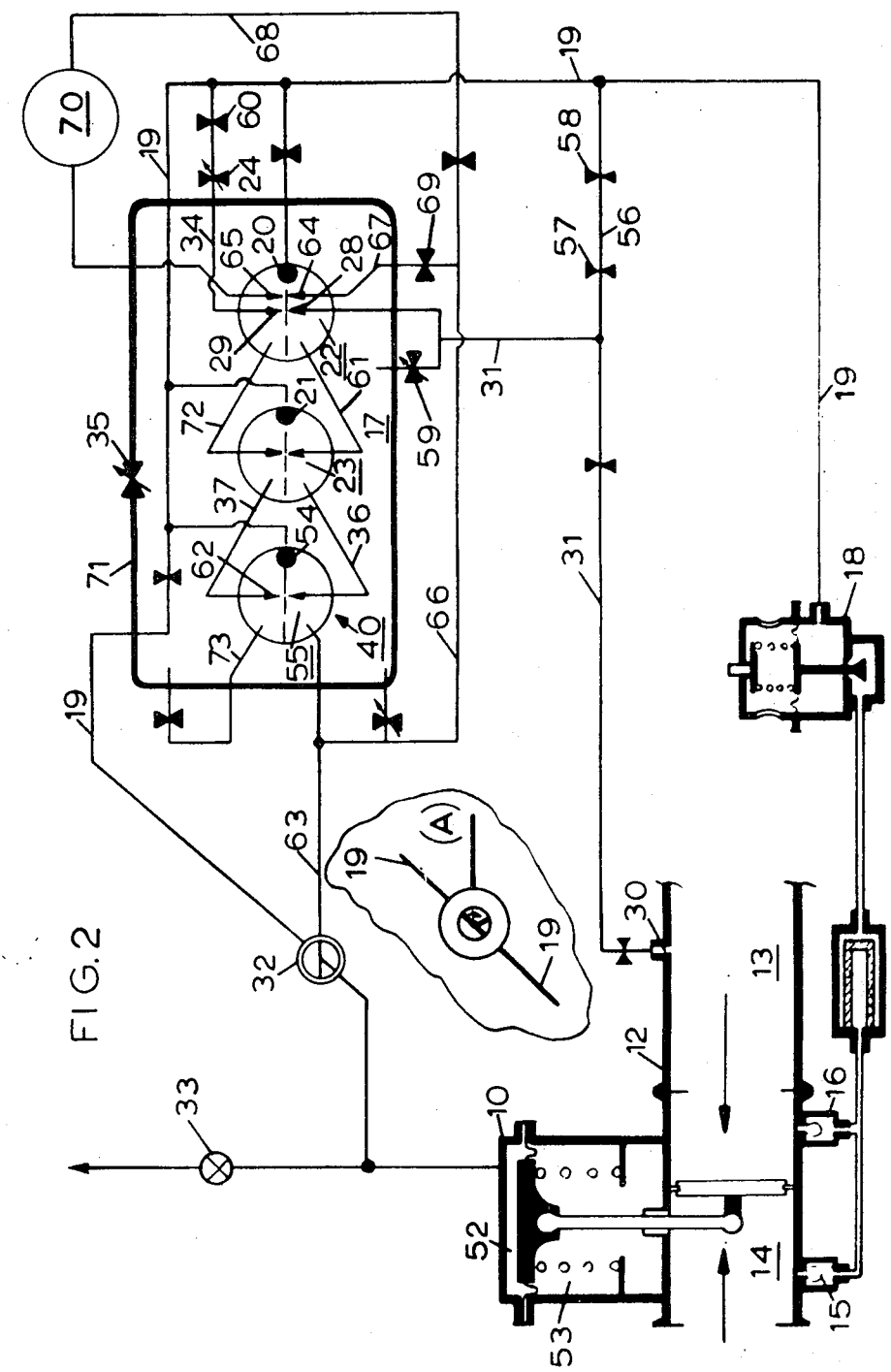
Figure 3:
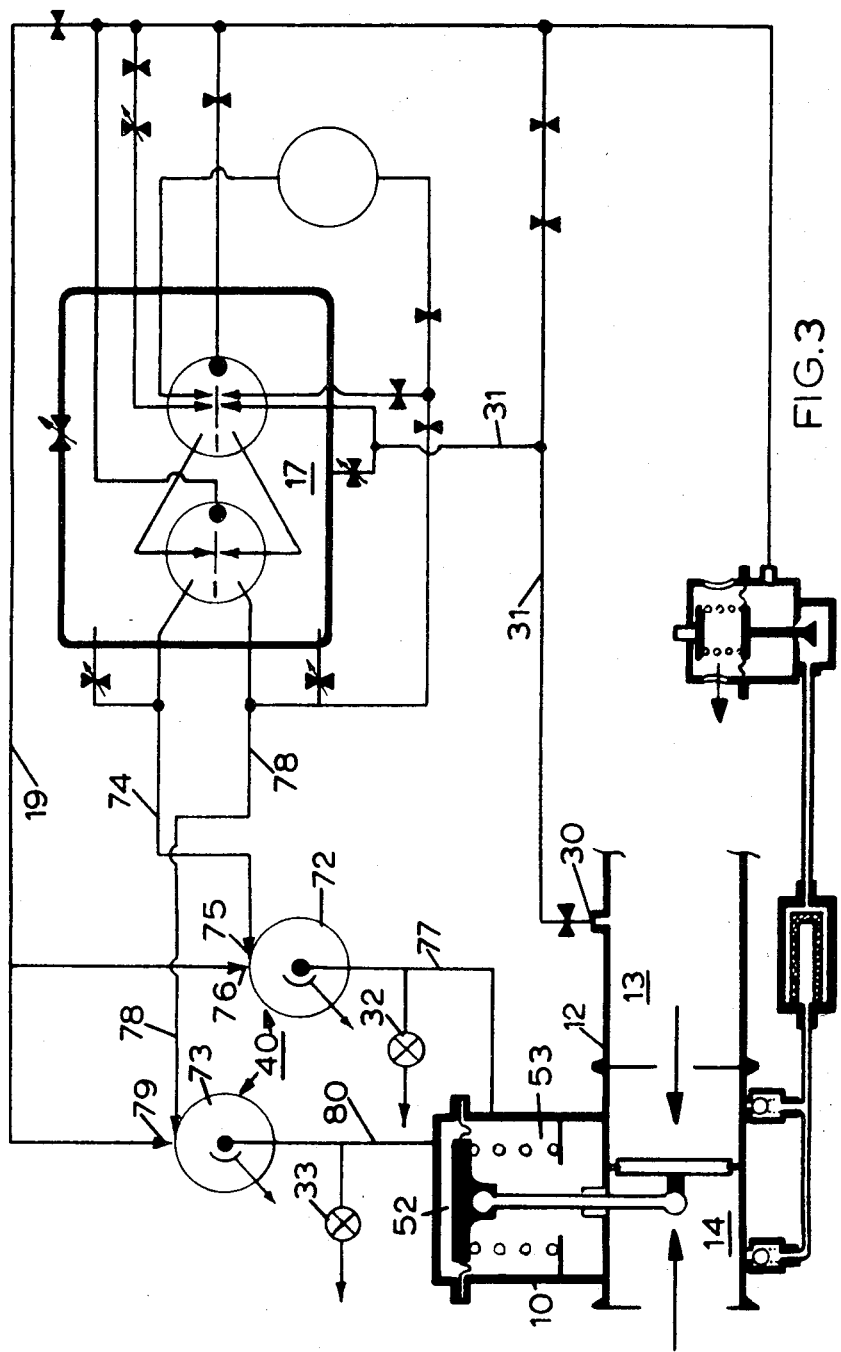
Figure 4:
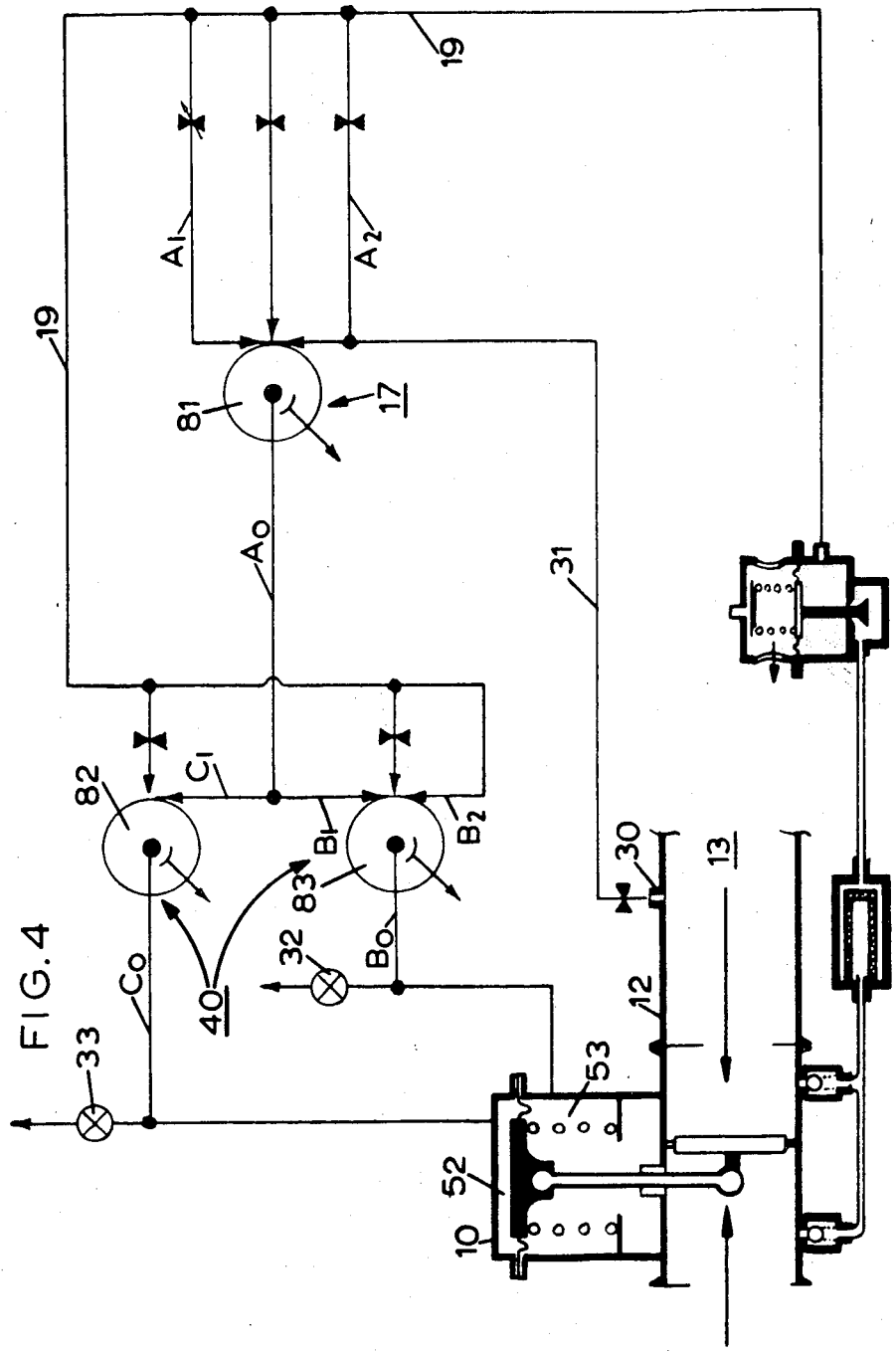
Figure 5:
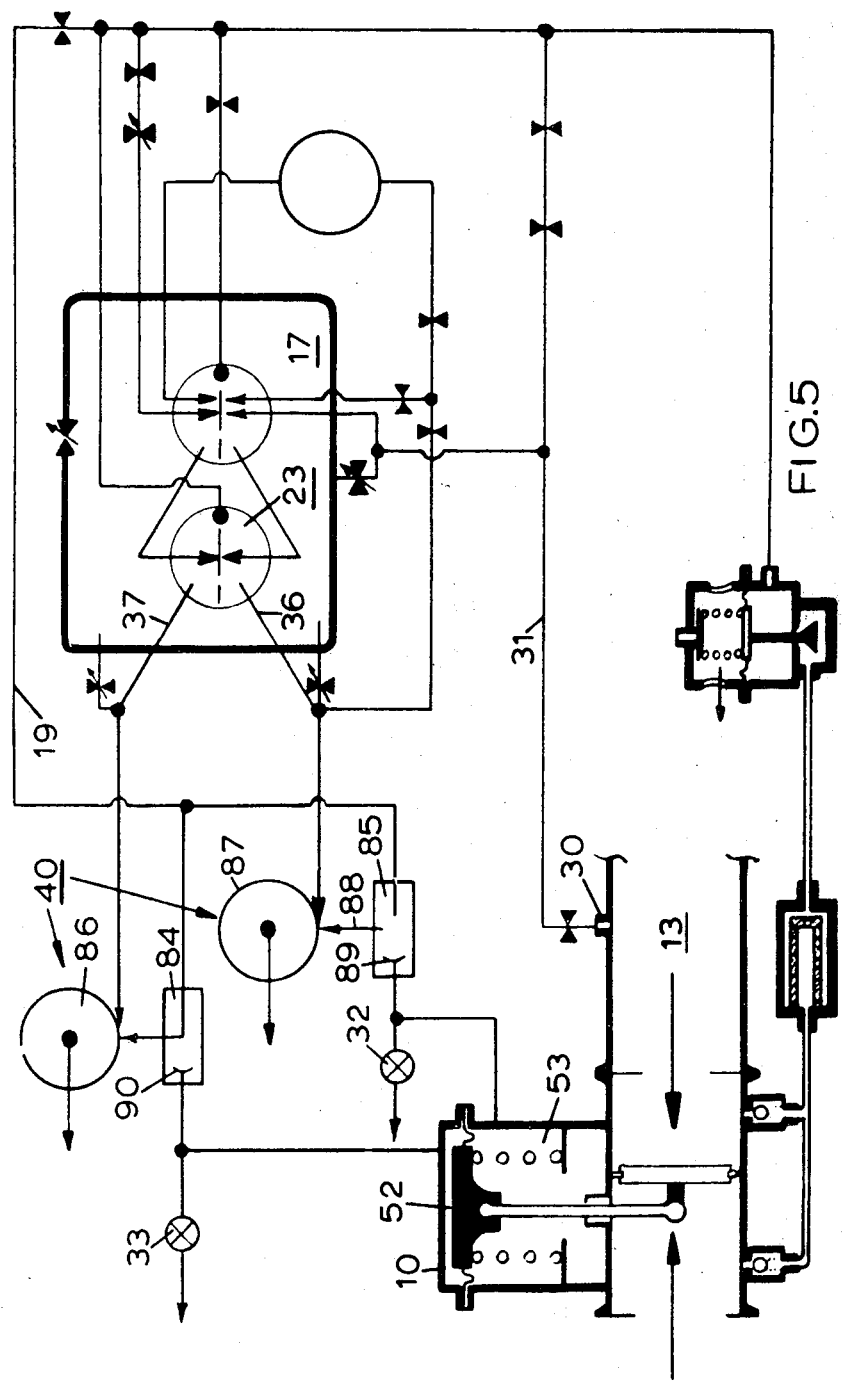

The invention will now be described by way of example only, with reference to the accompanying drawings, in which:

FIG. 1 shows fluidic control for a pressure-reducing valve incorporating a high flow capacity power relay, FIG. 1A shows a known type of jet interaction-beam deflection proportional amplifier, FIG. 2 shows the control system applied to a valve without the requirement of a power relay, FIG. 3 shows the control system where the power relay is replaced by a pair of vortex fluid elements, FIG. 3A shows a known type of vortex amplifier, FIG. 4 shows the control of a valve using vortex elements in place of the beam deflection elements of FIGS. 1-3, FIG. 5 is a modification of FIG. 3, where the vortex elements operate confined jet amplifiers, and FIG. 5A shows a known configuration of a confined jet amplifier operated by a vortex device.

In the various embodiments to be described three main types of fluidic device will be utilized, all these devices having no moving parts.

The first, a jet deflection, proportional amplifier, is shown in FIG. 1A. Variable deflection of the power jet 91 is achieved in response to changes in the control stream energies. When there is a difference of pressure between the control streams 92 and 93, deflection will cause more of the power jet to flow into one of the output receivers than the other (94 or 95). The amplifier characteristics include a relatively high response speed, modest flow, pressure and power gains, pressure recovery of more than 70 percent, and high load sensitivity.

The second is a vortex amplifier or valve (FIG. 3A). In operation, the main fluid stream 95 is introduced through power nozzle 96 at the outer wall of the vortex chamber, and is orientated to flow radially inward to the center output 97. The control input port 98 is located near the power input stream 96, and the control flow is directed perpendicularly against the main fluid supply 95.

If no control input is present the power stream flows directly to the output and encounters minimum impedance (the ratio of stream pressure drop per unit quantity of flow), therefore, the resulting output is high. When a control flow is introduced, the interaction of both streams results in significant changes. The tangential control flow enters the chamber and deflects the power stream away from its radial path to establish a spiral pattern, as shown. The deflection of the power stream and subsequent formation of the vortex lengthens the flow path and increases the acceleration of the main stream, which increases the pressure drop, the output being a variable factor decreasing with the increase of control pressure.

The third type of fluidic device is a vortex-controlled confined-jet amplifier (FIG. 5A). This device is basically a constant supply nozzle 100, axially aligned with the output receiver 101 within an enclosure 99. The receiver 101 is generally located approximately two nozzle diameters from the supply jet 100, and the flow condition between these two is turbulent. The input 102 is, in this example, controlled by a vortex flow control valve 103, and operates on a back pressure principle. No flow into the vortex chamber from control port 104 means that flow is drawn from the enclosure 99 of the amplifier, resulting in a low-pressure output through receiver 101. When a control stream enters the vortex chamber, maximum back pressure is felt through input pipe 102, and results in a high-pressure output through receiver 101.

Referring now to the drawings, FIG. 1 discloses a pressure-reducing valve for use in aircraft systems. The valve 10 is operably positioned in a duct 12 which in this case is part of an air conditioning system. The airflow through this valve may be from alternate directions, i.e., directly from the engine or main compressor assembly, or in the opposite direction from an auxiliary power unit. Dependent upon which side of the valve the pressure buildup occurs, i.e., regions 13 or 14, one of two nonreturn valves 15 and 16 fitted into duct 12 tap a sufficient airflow to operate the control system 17.

This main power stream passes through a filter 9 to remove contamination, and is pressure controlled by regulator 18, thus maintaining the source pressure constant.

Supply line 19 then conveys the power stream to power nozzles 20 and 21 of fluid amplifiers 22 and 23. Part of this stream is branched through variable resistors 24 and 25 in lines 26 and 27 to provide power for the control jets 28 and 29 of amplifier 22.

Pressure variations in region 13 of duct 12, whether positive or negative, may be sensed by the control system 17 via orifice 30 and control line 31. At this stage the system also includes a pair of solenoids 32 and 33 operably connected into control lines 31 and 34. The amplifier control system is enclosed in a chamber vented at 35, which is a variable resistor having a preset bleed to ambient to pressurize amplifier vents. Amplifier 23 has a fluidic phase shift circuit matched to the valve dynamic characteristics. This is basically in the form of a restricted capacity fed feedback loop from each of the output legs 36 and 37 of amplifier 23, and includes capacitors 7 and 8 and fixed resistors 5 and 6. This circuit terminates as two further controls 38 and 39 on the power stream from nozzle 21 of amplifier 23. The output from the fluidic control system is then transmitted to a high flow capacity power relay 40 designed to cope with air displacement from cylinders, and leaks past piston ring seals, etc. The signal terminates in either capsule 41 or 42, dependent on which output leg 37 or 36 is in operation. This relay is power fed from a tapping 43 downstream of the pressure regulator 18 through line 44 into chambers 45 and 46. Movement of either capsule actuates a central valve assembly 47, which tends to close one of a pair of poppet valves, resulting in an output signal in either outlet 38 or 49. This signal is transmitted through either one of control lines 50 and 51, to pressurize chamber 52, tending to open valve 10, or chamber 53, tending to close valve 10. It must be noted that the solenoids disclosed are not subjected to high pressures or high temperature at the coils. Solenoid operation bleeds air direct to ambient but then only in start-up, when the valve 10 is open, solenoid 33 closed and solenoid 32 open, and complete shutdown of the system, when the valve 10 is closed, solenoid 33 open and solenoid 32 closed. During normal controlling function, there is no flow from these solenoids.

In the embodiment of FIG. 2 there are two major modifications. A rolling diaphragm valve 10 replaces the piston-operated valve 10 of FIG. 1, this cuts out all leakage, and allows an additional power amplifier 55 (proportional element) to be used instead of the mechanical relay.

As previously described, pressure variations in region 13 of duct 12, whether positive or negative, may be sensed by the control system 17 via orifice 30, and transmitted through control line 31 to control jet 28 of amplifier element 22. All amplifier elements are powered from the same manifold line 19, and the sensing system operating on the back pressure principle is also connected to the manifold 19 by line 56 incorporating resistors 57 and 58. In order to balance the back pressure in line 31, a controlled bleed is tapped from this line through a variable resistor 59 into the chamber 71 containing the control system 17. It is a requirement of this embodiment that the valve 10 is initially biased toward the open position. This is achieved by a second control 29 on the power stream of element 22; this control is continually supplied by a further tapping through line 34 from manifold line 19, and its pressure is regulated by a pair of resistors 24 and 60, resistor 24 being adjustable. This bias flow deflects the power stream from power nozzle 20 to flow through outlet channel 61 to act against the power stream from nozzle 21 in element 23, and similarly deflect it through output channel 37, where it is transmitted to control jet 62 of power amplifier 55. Whilst there is only one power amplifier disclosed, it may be necessary to introduce further elements to provide a signal of sufficient strength to actuate the valve 10. However, the output from power element 55 is passed through line 63 to solenoid 32, which as shown, is in the position where it allows the signal to pass directly into chamber 52 of valve 10. As solenoid 33 is closed, the valve is biased toward the open condition.

It will also be noted from the diagram that a capacity fed feedback system is provided to stabilize the system, tapped from output channel 63 of the power element, and applied to control jets 64 and 65 of element 22 via lines 66, 67 and 68, restrictor 69 and capacitor 70, and both outputs from the final power amplifier are connected back into the chamber 71 to balance back pressures.

Under normal operating conditions, when the valve 10 is controlling it can be seen that if, for example, a sudden pressure increase occurs within region 13 of duct 12, the pressure signal will be transmitted to element 22 of the system, and oppose the bias flow from control jet 29. This will now deflect the power stream through outlet channel 72, which alters the switching sequence in subsequent elements 23 and 55, such that final power output passes through output channel 73, which terminates with chamber 71. As there is no flow to valve 10, this initiates a pressure drop within chamber 52 of valve 10, and urges it to close, this restricting the flow through the valve, and reduce the pressure within region 13. For a pressure decrease, the opposite switching sequence actuates the valve toward the open position, therefore increasing the flow to increase the pressure within region 13.

Manual operation of the solenoids 32 and 33 can alter the operating sequence of the pressure-reducing valve. As has been described, when the valve is controlling, solenoid 33 is shut, while solenoid 34 is in the position shown.

To manually close the valve 10, solenoid 33 is opened, while solenoid 32 remains open. Pressure within chamber 52 is reduced, and the spring urges the valve closed. Finally, to retain the valve 10 in an open condition, solenoid 33 is closed and solenoid 32 is opened, but in the position shown as an insert A. In this condition the manifold pressure in line 19 has a straight-through path into chamber 52 and urges the valve open.

In the embodiment of FIG. 3 the mechanical relay of FIG. 1 is replaced by a pair of vortex fluidic elements which increase the system reliability and simplicity. If the valve 10 is of the piston-actuated type, these vortex devices will have to be sufficient size (flow capacity) to overcome the leakage past the piston. As this would be no problem with a diaphragm actuator, this type of valve has been depicted.

Using the simple analysis of a vortex element where maximum swirl gives low-pressure pickoff, and minimum swirl gives high-pressure pickoff, the introduction of elements 72 and 73 to the circuit will cause the following valve operating sequence. The control system 17 is basically the same as shown in FIG. 1 with the feedback arrangement of FIG. 2, and its operation will be as previously disclosed. When a pressure decrease occurs within region 13 of duct 12, the output from the control pack 17 is transmitted through output channel 74 to control port 75 of vortex element 72. This control causes the power flow from manifold line 19 through power nozzle 76 to swirl, resulting in a low-pressure pickoff in line 77. There is, therefore, no swirl condition in vortex element 73, due to there being no control flow in line 78 to interfere with the power stream from power nozzle 79, therefore resulting in a high-pressure pickoff from element 73 through line 80. Chambers 52 and 53 of valve 10 are hence subjected to a pressure increase and pressure decrease respectively, thereafter urging the valve 10 to open and so increase pressure conditions within region 13. It will be understood that when the pressure increase develops over a predetermined level the reverse switching sequence occurs, closing the valve 10 to reduce pressure in region 13. The system is still provided with a manual override, utilizing solenoids 32 and 33, and when the valve is controlling normally both are shut off. When it is required that the valve be opened, solenoid 33 is closed, while solenoid 32 remains open. To manually close the valve, solenoid 33 must be open and solenoid 32 closed.

In the system shown in FIG. 4, vortex element 81 replaces the beam-deflecting elements 22 and 23 of FIGS. 1, 2 and 3, and vortex elements 82 and 83 act as power amplifiers to actuate the valve 10, all elements being powered from manifold line 19. Pressure variations in region 13 of duct 12 are sensed, as previously described, by sensing port 30 and sensing line 31 and transmitted to vortex element 81.

Pressure conditions in the control lines can be summarized as follows:

When a reduced pressure exists in region 13, control pressure $A_2$ into element 81 is low, and control pressure $A_1$ is high; therefore, conditions of swirl exist and the output pressure $A_0$ is low. Control pressure $B_1$ on element 83 is, therefore, low, and control pressure $B_2$, fed directly from the manifold 19, is high. Swirl conditions exist and the pickoff pressure $B_0$ is low. Control pressure $C_1$ of element 82 is also low, no swirl exists, and pressure $C_0$ approaches a maximum value.

As both solenoids 32 and 33 are closed, there is a pressure drop in chamber 53 of valve 10, a pressure increase in chamber 52, and the valve is urged toward the open condition.

On a reversal of conditions due to a pressure increase in region 13 of duct 12, the reverse switching sequence occurs. Chamber 53 of valve 10 is pressurized, chamber 52 depressurizes, and the valve 10 is urged to shut. As described when valve 10 is controlling, both solenoids 32 and 33 are shut. To manually open the valve and maintain it in this condition, solenoid 33 remains shut, solenoid 32 is opened, chamber 52 will then pressurize, and the valve opens. To manually close the valve the solenoid positions are reversed, solenoid 33 is opened and solenoid 32 shut.

In the embodiment of FIG. 5, the mechanical relay of FIG. 1 is replaced by a pair of confined jet amplifier elements 84 and 85 operated by vortex elements 86 and 87 respectively. Both of elements 84 and 85 are supplied with a constant pressure power stream from manifold line 19, and the control streams for vortex elements 86 and 87 are taken directly from the output channels 37 and 36 respectively of element 23 in the control pack 17.

When valve 10 is in its controlling mode both solenoids 32 and 33 are shut, therefore, when a pressure increase is sensed within region 13, the output from the control pack 17 is through output channel 36 of element 23. This transmits a control signal into the vortex chamber of vortex elements 87, causing a condition of swirl which sets up a back pressure in line 88, interconnecting elements 85 and 87. As this back pressure effectively restricts any pressure loss from element 85, the pressure output through receiver 89 is high, therefore pressurizing chamber 53 of valve 10, thus tending to close the valve.

When a decrease is sensed in region 13, the reverse switching comes into operation, and the output from the control pack is via channel 37 of element 23. The same situation develops in elements 84 and 86, resulting in this case in a high-pressure output from receiver 90, pressurizing chamber 52 of valve 10, which tends to open the valve.

As described previously, manual operation of valve 10 can be initiated. The opening of solenoid 33 and closing of solenoid 32 will close valve 10, whereas the closing of solenoid 33 and the opening of solenoid 32 will open valve 10.

Dependent upon the particular output characteristics of the preferred system, various modifications may be necessary, but would still fall within the general scope of the invention, e.g., additional feedback systems may be incorporated, and additional stages of amplification could also be introduced where required. While only pressure control has been described, the principle of the invention may quite satisfactorily be adapted to control temperature, in this instance, a fluidic oscillation circuit, well known for temperature sensing applications, may be used with the control system shown, to regulate the temperature fluctuations of, for example, an air conditioning system.

We claim as our invention:

1. A fluid operated pressure control system for regulating pressure within an enclosure, comprising an enclosure, a variably settable device for varying pressure in the enclosure in accordance with its setting, a control system located outside the enclosure but responsive to pressure conditions in said enclosure for variably setting said device to maintain pressure in the enclosure at a desired value, said control system comprising at least one fluid amplifier having a principal fluid stream controlled by interaction with at least one control fluid stream such that the output of the amplifier is determined by the control fluid stream, mans for feeding the principal and control fluid streams, and means for sensing pressure variations in said enclosure and appropriately varying said control stream to, in turn, vary the output of said amplifier and effect a change of setting of said device to restore the pressure in the enclosure to said desired value.

2. Apparatus as claimed in claim 1 wherein said sensing means comprises conduit means fluidly communicating said enclosure and said control stream whereby the effect of the control stream on the principal stream varies with pressure variations in said enclosure.

3. Apparatus as claimed in claim 2 wherein said variably settable device is a pressure-reducing valve operably positioned in a fluid duct connected to a pressure fluid source and said enclosure comprises a portion of said duct downstream from said pressure-reducing valve.

4. Apparatus as claimed in claim 3 wherein said amplifier is enclosed in a chamber remote from said enclosure and vented to ambient through a variable resistor to pressurize amplifier vents.

5. Apparatus as claimed in claim 1 further comprising selectively actuatable override controls for setting said device in positions for establishing either maximum or minimum pressures.

6. Apparatus as claimed in claim 5 wherein said override controls comprise solenoid-operated valves connected in said control system.

7. Apparatus as claimed in claim 3 wherein said means for feeding the principal and control fluid streams comprise fluid passage means communicating the fluid duct with said amplifier.

8. Apparatus as claimed in claim 7 wherein said fluid passage means for said principal stream is connected with said duct on both sides of said pressure-reducing valve through nonreturn valves, and wherein a pressure regulator is incorporated in said fluid passage means between said nonreturn valves and said amplifier.

* * * * *